US012362489B2

(12) United States Patent
Da Silveira et al.

(10) Patent No.: US 12,362,489 B2
(45) Date of Patent: Jul. 15, 2025

(54) VERY EFFICIENT 5G/6G ANTENNA ARRAY SYSTEM (AAS) FEED

(71) Applicant: TELEFONAKTIEBOLAGET LM ERICSSON (PUBL), Stockholm (SE)

(72) Inventors: Marthinus Da Silveira, Ottawa (CA); Neil McGowan, Stittsville (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 156 days.

(21) Appl. No.: 18/278,944

(22) PCT Filed: Feb. 26, 2021

(86) PCT No.: PCT/IB2021/051642

§ 371 (c)(1),
(2) Date: Aug. 25, 2023

(87) PCT Pub. No.: WO2022/180431

PCT Pub. Date: Sep. 1, 2022

(65) Prior Publication Data

US 2024/0136720 A1 Apr. 25, 2024
US 2024/0235035 A9 Jul. 11, 2024

(51) Int. Cl.

*H01P 3/18* (2006.01)
*H01P 3/06* (2006.01)
*H01Q 9/04* (2006.01)
*H01Q 21/06* (2006.01)

(52) U.S. Cl.

CPC ............. *H01Q 9/0485* (2013.01); *H01P 3/06* (2013.01); *H01Q 21/068* (2013.01)

(58) Field of Classification Search

CPC ....... H01Q 9/0485; H01Q 21/068; H01P 3/06
See application file for complete search history.

(56) References Cited

U.S. PATENT DOCUMENTS

2010/0307798 A1 12/2010 Izadian

OTHER PUBLICATIONS

Wang, "Loss Mechanism of the SISL and the Experimental Verifications", IET Microwaves, Antennas & Propagation, 2019, vol. 13, pp. 1768-1772 (Year: 2019).*

(Continued)

*Primary Examiner* — Henry Luong
(74) *Attorney, Agent, or Firm* — Sonoda & Kobayashi Intellectual Property Law; Sarvajit S. Patil

(57) ABSTRACT

Embodiments of a radio frequency feedline structure. A first printed circuit board (PCB) includes upper and lower metal layers and at least one cutout defining an upper portion of an open channel. The upper and lower metal layers are electrically connected by vias on opposite walls of the cutout. A second PCB includes upper and lower metal layers and elongated slots defining a suspended signal path within the open channel. The upper and lower metal layers are electrically connected by vias. A third PCB includes upper and lower metal layers and at least one cutout defining a lower portion of the open channel. The upper and lower metal layers are electrically connected by vias on opposite walls of the cutout. Respective upper and lower ground planes are electrically connected to the upper metal layer of the first PCB and the lower metal layer of the third PCB.

15 Claims, 5 Drawing Sheets

(56) References Cited

OTHER PUBLICATIONS

Wang et al: "Loss mechanism of the SISL and the experimental verifications", IET Microwaves, Antennas & Propagation, the Institution of Engineering and Technology, United Kingdom, vol. 13, No. 11, Jun. 14, 2019.

Webster et al: "Empty Substrate-Integrated Waveguides: A Low-Cost and Low-Profile Alternative for High-Performance Microwave Devices" In: "Wiley Encyclopedia of Electrical and Electronics Engineering", Sep. 24, 2020.

* cited by examiner

VERY EFFICIENT 5G/6G ANTENNA ARRAY SYSTEM (AAS) FEED

This application is a 35 U.S.C. § 371 national phase filing of International Application No. PCT/IB2021/051642, filed Feb. 26, 2021, the content of which is incorporated herein by reference in its entirety.

TECHNICAL FIELD

The present disclosure relates to Antenna Array Systems (AAS) and in particular very efficient 5G/6G AAS feed structures.

BACKGROUND

An Antenna Array System (AAS) typically includes a plurality of antenna radiating elements mounted on a printed circuit board (PCB) that also provides microstrip feed lines for conducting signals to/from each radiating element. Normally, the feedlines are terminated at an rf connector, which couples each feedline to amplifiers and filters mounted on another printed circuit board.

In an AAS configured with a large number of antenna radiating elements, the feed lines may have a length of several hundreds of millimeters, and the insertion loss associated with such long lines may significantly degrade performance of the AAS. It is known that high insertion losses can be mitigated by the use of low-loss dielectric material in the PCB. Stripline techniques, in which the signal transmission line is suspended in dielectric between a pair of ground planes can be used (either alone or in combination with low-loss dielectric material) to achieve low loss relative to microstrip. However, low-loss dielectric PCB material is expensive, as is the manufacture and assembly of stripline transmission lines. Consequently, both of these known techniques significantly increase the cost of the AAS as a whole.

Very efficient feedline structures that can be constructed at low cost remain highly desired.

SUMMARY

An aspect of the present invention provides a radio frequency (RF) feedline structure. A first printed circuit board (PCB) includes an upper metal layer, a lower metal layer, and at least one elongated cutout defining an upper portion of an open channel, the upper and lower metal layers being electrically connected by at least one of metal plating and a plurality of vias disposed along opposite walls of the at least one elongated cutout. A second PCB includes an upper metal layer, a lower metal layer, and a plurality of elongated slots defining a suspended signal path disposed co-linearly within the open channel, the upper and lower metal layers being electrically connected by at least one of metal plating and a plurality of vias disposed along the suspended signal path. A third PCB includes an upper metal layer, a lower metal layer, and at least one elongated cutout defining a lower portion of the open channel, the upper and lower metal layers being electrically connected by at least one of metal plating and a plurality of vias disposed along opposite walls of the at least one elongated cutout. Respective upper and lower ground planes are electrically connected to the upper metal layer of the first PCB and the lower metal layer of the third PCB. The upper and lower ground planes electrically close the corresponding upper and lower portions of the open channel.

In some embodiments, the plurality of vias of the first PCB comprise half-vias disposed along opposite walls of the at least one elongated cutout.

In some embodiments, the plurality of vias of the first PCB comprise vias disposed proximal a tab between a pair of adjacent ones of the at least one elongated cutout.

In some embodiments, the plurality of vias of the third PCB comprise half-vias disposed along opposite walls of the at least one elongated cutout.

In some embodiments, the plurality of vias of the third PCB comprise vias disposed proximal a tab between a pair of adjacent ones of the at least one elongated cutout.

In some embodiments, the at least one of metal plating and plurality of vias of the first PCB are electrically connected to the upper metal layer of the second PCB; and the at least one of metal plating and plurality of vias of the third PCB are electrically connected to the lower metal layer of the second PCB.

In some embodiments, a spacing between adjacent ones of the vias of the first and third PCBs is selected to minimize leakage of RF signals propagating along the suspended signal path. In specific embodiments the spacing is approximately one-tenth of a center wavelength of the RF signals propagating along the suspended signal path.

In some embodiments, the suspended signal path comprises: an upper signal trace co-planar with the upper metal layer of the second PCB; a lower signal trace co-planar with the lower metal layer of the second PCB; and at least one of metal plating and a plurality of vias electrically connecting the upper and lower signal traces.

In some embodiments, the upper and lower signal traces have a common width.

In some embodiments, the width of the upper and lower signal traces is based at least in part on a thickness of the first and third PCBs and a desired characteristic impedance of the RF feedline structure.

In some embodiments, a gap between an edge of one signal trace and a wall of the open channel is equal to or greater than the width of the signal trace.

In some embodiments, a width of each slot of the second PCB is equal to or less than the gap between an edge of one signal trace and a wall of the open channel.

In some embodiments, the upper ground plane comprises a metal layer of a fourth PCB.

In some embodiments, the lower ground plane comprises a metal layer of a fifth PCB.

Some embodiments further include a respective dielectric coating on at least one of the metal layers. In specific embodiments, the respective dielectric coating on at least one of the metal layers is a soldermask.

An advantages of the present invention is that low cost printed circuit board material (such as commonly available FR4) and low-cost PCB fabrication methods can be used to construct RF feedline structures having approximately half the insertion loss as stripline structures made with low loss material, and at dramatically lower cost.

BRIEF DESCRIPTION OF THE DRAWINGS

The accompanying drawing figures incorporated in and forming a part of this specification illustrate several aspects of the disclosure, and together with the description serve to explain principles of the disclosure.

FIGS. 3A-C are respective views of PCB-2 of FIG. 1A, wherein FIG. 3A is a top view of an embodiment of PCB-2, and FIGS. 3B and 3C are respective cross-sectional views of embodiments of PCB-2 of FIG. 1A;

DETAILED DESCRIPTION

Figure 1A:
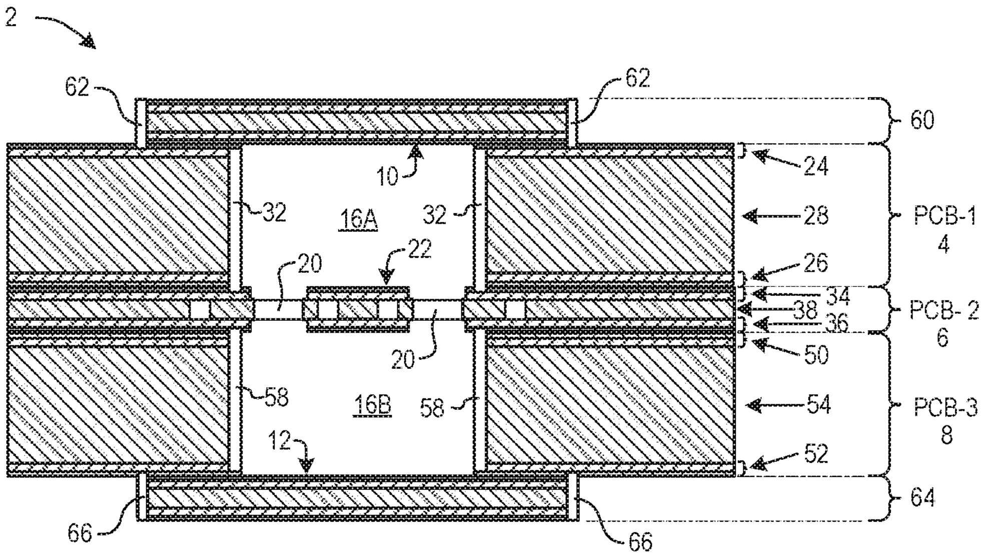
FIGS. 1A and 1B are cross-sectional and exploded perspective views of a feedline structure in accordance with a representative embodiment of the present disclosure.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Systems and methods are disclosed herein that provide a radio frequency (RF) feedline structure. A first printed circuit board (PCB) includes an upper metal layer, a lower metal layer, and at least one elongated cutout defining an upper portion of an open channel. The upper and lower metal layers are electrically connected by at least one of metal plating and a plurality of vias disposed on opposite walls of the at least one elongated cutout. A second PCB includes an upper metal layer, a lower metal layer, and a plurality of elongated slots defining a suspended signal path disposed co-linearly within the open channel. The upper and lower metal layers of the second PCB are electrically connected by at least one of metal plating and a plurality of vias disposed along the suspended signal path. A third PCB includes an upper metal layer, a lower metal layer, and at least one elongated cutout defining a lower portion of the open channel. The upper and lower metal layers are electrically connected by at least one of metal plating and a plurality of vias disposed on opposite walls of the at least one elongated cutout. Respective upper and lower ground planes are electrically connected to the upper metal layer of the first PCB and the lower metal layer of the third PCB. The upper and lower ground planes electrically close the corresponding upper and lower portions of the open channel In some embodiments, the plurality of vias of the first PCB comprise half-vias disposed along opposite walls of the at least one elongated cutout.

In some embodiments, the plurality of vias of the first PCB comprise vias disposed proximal a tab between a pair of adjacent ones of the at least one elongated cutout.

In some embodiments, the plurality of vias of the third PCB comprise half-vias disposed along opposite walls of the at least one elongated cutout.

In some embodiments, the plurality of vias of the third PCB comprise vias disposed proximal a tab between a pair of adjacent ones of the at least one elongated cutout.

In some embodiments, the at least one of metal plating and plurality of vias of the first PCB are electrically connected to the upper metal layer of the second PCB; and the at least one of metal plating and plurality of vias of the third PCB are electrically connected to the lower metal layer of the second PCB.

In some embodiments, a spacing between adjacent ones of the vias of the first and third PCBs is selected to minimize leakage of RF signals propagating along the suspended signal path. In specific embodiments the spacing is approximately one-tenth of a center wavelength of the RF signals propagating along the suspended signal path.

In some embodiments, the suspended signal path comprises: an upper signal trace co-planar with the upper metal layer of the second PCB; a lower signal trace co-planar with the lower metal layer of the second PCB; and at least one of metal plating and a plurality of vias electrically connecting the upper and lower signal traces.

In some embodiments, the upper and lower signal traces have a common width.

In some embodiments, the width of the upper and lower signal traces is based at least in part on a thickness of the first and third PCBs and a desired characteristic impedance of the RF feedline structure.

In some embodiments, a gap between an edge of one signal trace and a wall of the open channel is equal to or greater than the width of the signal trace.

In some embodiments, a width of each slot of the second PCB is equal to or less than the gap between an edge of one signal trace and a wall of the open channel.

In some embodiments, the upper ground plane comprises a metal layer of a fourth PCB.

In some embodiments, the lower ground plane comprises a metal layer of a fifth PCB.

Some embodiments further include a respective dielectric coating on at least one of the metal layers. In specific embodiments, the respective dielectric coating on at least one of the metal layers is a soldermask.

A representative embodiment of the RF feedline is illustrated in FIGS. 1-4. In the embodiment of FIGS. 1-4, the RF feedline structure 2 comprises a first printed circuit board (PCB-1) 4; a second printed circuit board (PCB-2) 6; a third printed circuit board (PCB-3) 8; and a pair of ground planes 10 and 12. Elongated cutouts 14A and 14B in the first and third printed circuit boards 4 and 8, respectively, define corresponding upper and lower portions 16A and 16B of an open channel 18. Elongated slots 20 in the second printed circuit (FIG. 3) board 6 defines a suspended signal path 22 that is co-linear with the open channel 18.

Figure 2A:
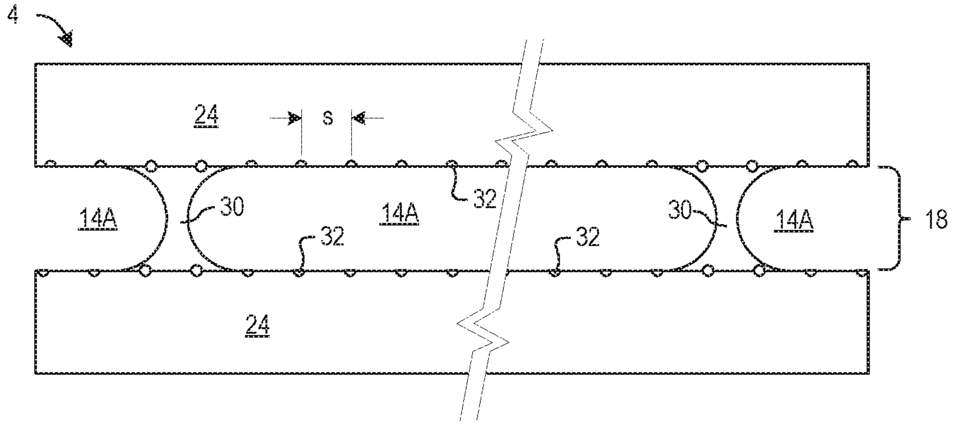
FIGS. 2A and 2B are respective top views of embodiments of PCB-1 of FIG. 1A.
Figure 2B:
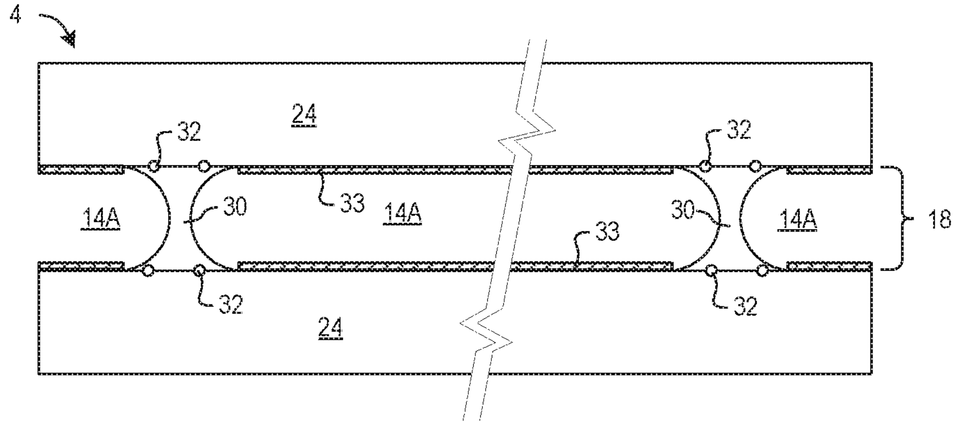
Figure 1B:
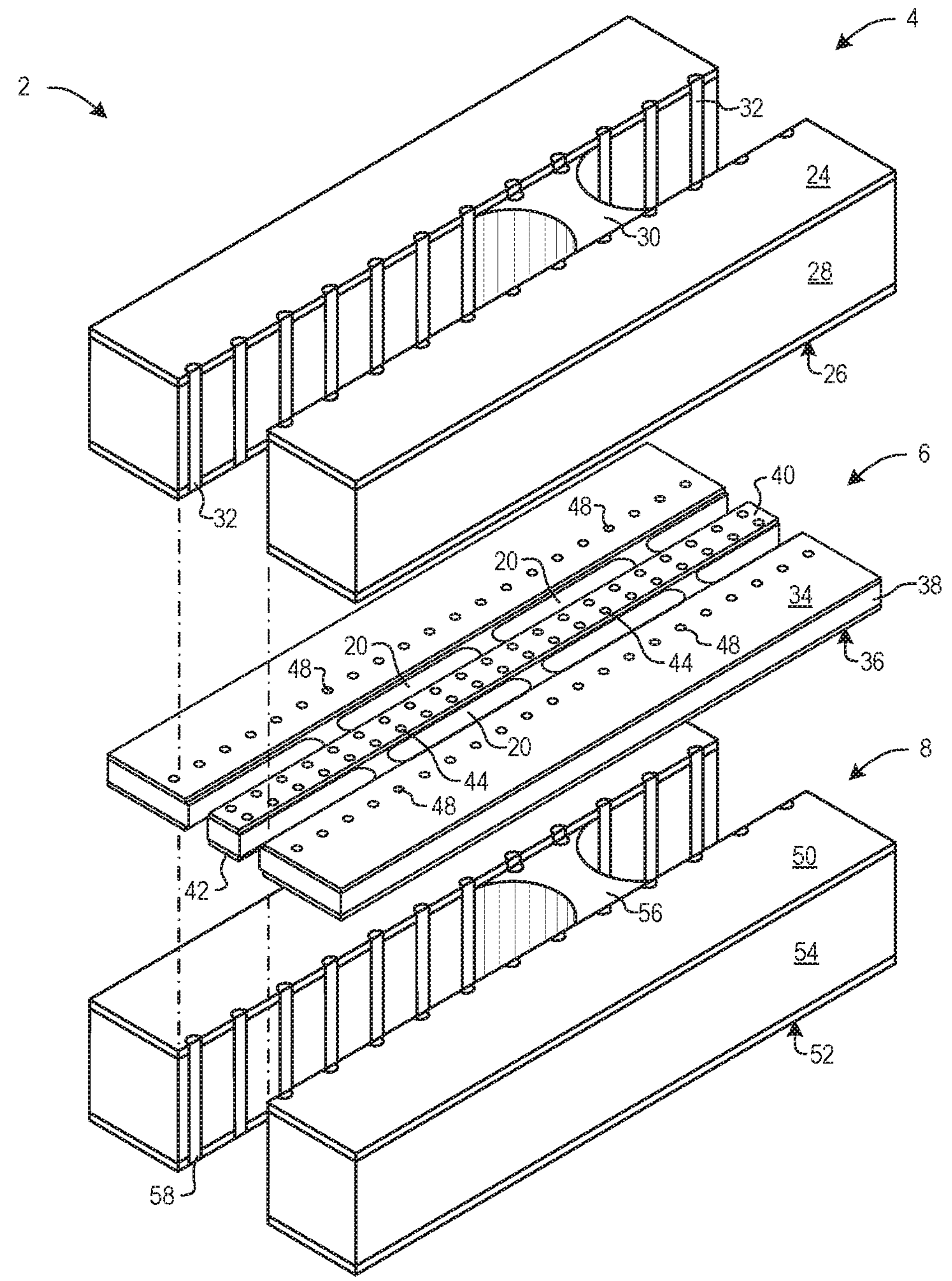
Figure 3A:
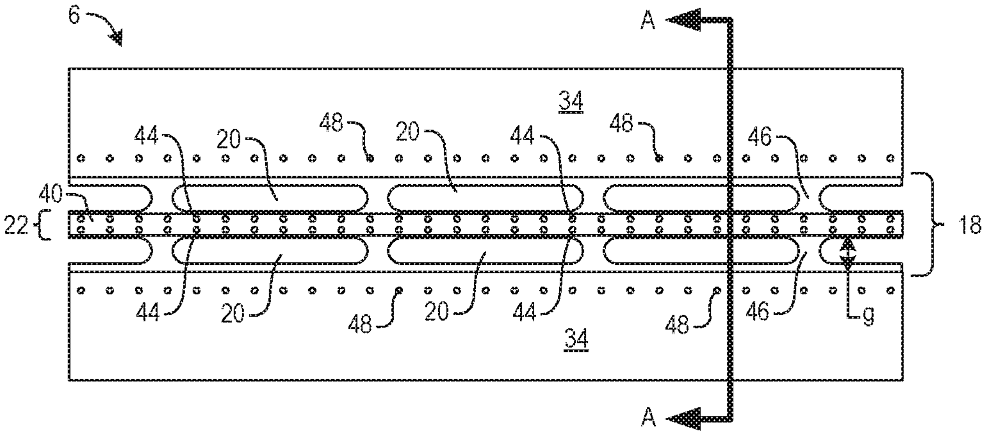
Figure 3B:
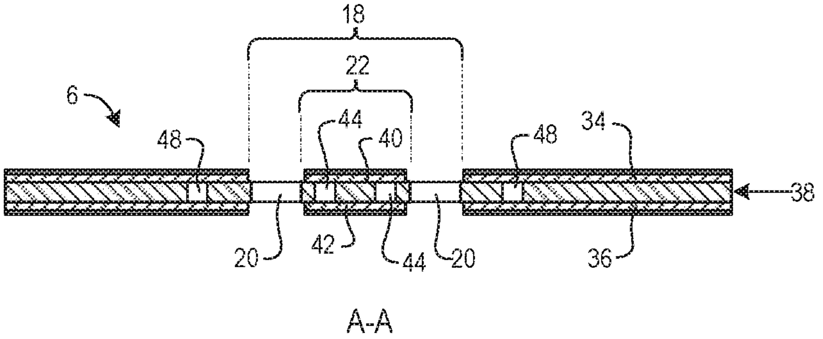
Figure 3C:
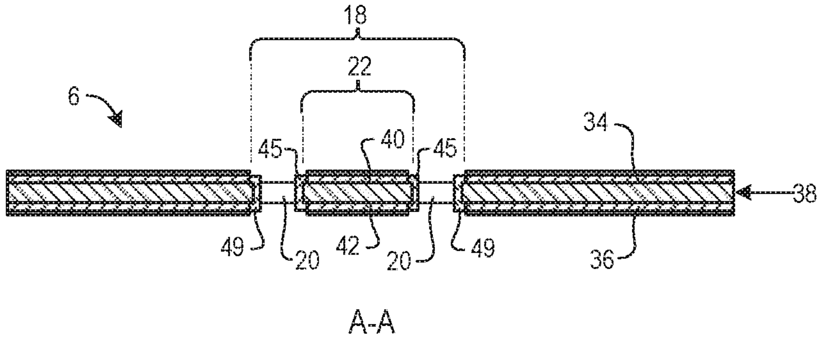
Figure 4A:
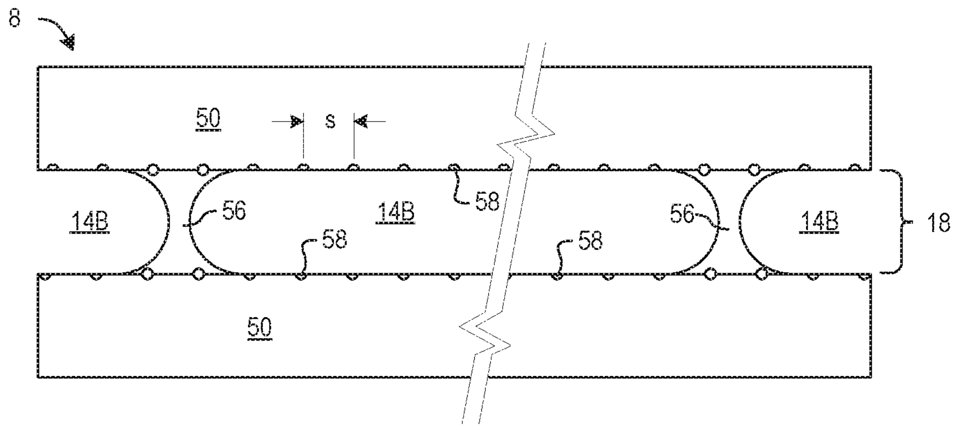
FIGS. 4A and 4B are respective top views of embodiments of PCB-3 of FIG. 1A.

In the drawings, FIG. 1 is a cross sectional view of the RF feedline structure 2; FIG. 2 is a top view of PCB-1 4; FIGS. 3A and 3B respectively show top and cross-sectional views of view of PCB-2 6; and FIG. 4 is a top view of PCB-3 8.

Referring to FIGS. 1 and 2, PCB-1 4 includes an upper metal layer 24 and a lower metal layer 26 separated by a dielectric layer 28. Optionally, each metal layer may be covered by a thin dielectric coating such as, for example, soldermask. In FIG. 1, PCB-1 4 is shown as a dual-sided printed circuit board, in which the upper and lower metal layers 24 and 26 are disposed on opposite surfaces of the dielectric layer 28. PCB-1 4 may be fabricated using a low-cost printed circuit board material such as FR-4, which is commonly available from multiple manufacturers. FR-4 printed circuit board material is readily available in a variety of core (i.e. dielectric layer 38) thicknesses. For example, FR-4 epoxy laminate boards with core thicknesses between 0.8 and 3.2, in 0.2 mm increments, are typically available from various manufacturers. PCB-1 4 may be formed as a dual-sided printed circuit board having a relatively thick core thickness, but this is not essential. If desired, PCB-1 4 may be provided as a multi-layer printed circuit board having one or more intermediate metal layers between the upper and lower metal layers 10 and 12. In such cases, PCB-1 4 may be fabricated using a two or more FR-4 printed circuit boards assembled together in a manner known in the art.

The elongated cut-outs 14A may have any suitable length, and may be formed by any suitable technique, such as, for example, computer-numerically controlled (CNC) milling or laser cutting. Tabs 30 extending between adjacent cut-outs 14A along the length of the open channel 18 are composed solely of dielectric layer 28 material (i.e. metal layers 24 and 26 are removed), but otherwise may have any suitable shape or configuration. In general terms, the number, placement and size of the tabs 30 may be selected to provide a suitable structural connection between portions of the PCB-1 4 extending on opposite sides of the open channel 18, while minimizing dielectric losses along the signal path 22. Dielectric losses are minimized by minimizing the volume of dielectric layer 28 material that is intersected by RF fields between the signal path 22 and the upper ground plane 10, which favors minimizing both the number and size of the tabs 30. However, in practice it may not be possible to eliminate the tabs 30 entirely, so that a suitable balance between reducing dielectric losses and maintaining acceptable structural rigidity may be obtained. In the illustrated embodiment, the shape of each tab 30 is determined by the circular ends of each cut-out 14A, which corresponds to the use of a drill or milling cutter which may be used to form the cut-outs 14A.

In order to prevent RF signal leakage into the dielectric layer 28 material outside of the open channel 18, the upper and lower metal layers 24 and 26 are electrically connected, such as by vias 32 disposed along opposite walls of the cut-out 14A. These vias 32 (which may be half-vias, also known as plated half-holes or plated castellated holes) may be formed in a manner known in the art. A spacing (s) between adjacent vias 32 may be selected to minimize RF signal leakage. For example, in some embodiments the spacing (s) may correspond to one-tenth (1/10) of a center wavelength of RF signals transmitted through the RF feedline. If desired, the upper and lower metal layers 24 and 26 may be electrically connected by metal plating 33 (FIG. 2B), either alone, or in combination with the vias 32. Metal plating can readily be formed on the inner walls of each cut-out 14A, except on each tab 30, using techniques well known in the art. For example, FIG. 2B illustrates a specific embodiment in which metal plating 33 is used to connect upper and lower metal layers 24 and 26 along the length of a cut-out 14A, and vias 32 (eg half-vias and/or full vias, as needed) used to prevent RF signal leakage at each tab 30.

Referring to FIGS. 1, 3A-3C, PCB-2 6 includes an upper metal layer 34 and a lower metal layer 36 separated by a dielectric layer 38. Optionally, each metal layer 34 and 36 may be covered by a thin dielectric coating such as, for example, soldermask. This helps to prevent metal to metal incidental contact that can cause passive intermodulation. In the illustrated embodiment, PCB-2 6 is shown as a dual-sided printed circuit board, in which the upper and lower metal layers 34 and 36 are disposed on opposite surfaces of the dielectric layer 38. PCB-2 6 may be fabricated using a low-cost printed circuit board material such as FR-4. As noted above, FR-4 is commonly available from multiple manufacturers in a variety of core thicknesses. Preferably, PCB-2 6 is formed as a dual-sided printed circuit board having the smallest available core thickness, but this is not essential.

PCB-2 6 may be electrically and mechanically connected to PCB-1 4, by solder connections between each of the vias 32 of PCB-1 4 and the upper metal layer 34 of PCB-2 6. In embodiments in which the upper and lower metal layers 24 and 26 are connected by metal plating 33. the metal plating 33 may similarly be connected to the upper metal layer 34 of PCB-2 6 by solder connections. The use of solder connections in this manner is advantageous in that it is inexpensive to manufacture and prevents RF signal leakage through any soldermask on either or both of the lower metal layer 26 of PCB-1 4 and the upper metal layer 34 of PCB-2 6.

In the illustrated embodiment, the suspended signal path 22 includes an upper signal trace 40 co-planar with the upper metal layer 34, and a lower signal trace 42 co-planar with the lower metal layer 36. The upper and lower signal traces 40 and 42 may be electrically connected together, such as by a plurality of vias 44. In general terms, the vias 44 operate to electrically connect the upper and lower signal traces 40 and 42 so that they co-operate as a single stripline within the open channel 18. This arrangement eliminates dielectric losses due to RF fields intersecting dielectric layer 38 material between the upper and lower signal traces 40 and 42. Alternatively, the upper and lower signal traces 40 and 42 may be electrically connected by metal plating 45 (FIG. 3C) and/or half-vias (not shown) within the elongated slots 20. Such half-vias and/or metal plating may be formed in a manner known in the art.

The upper and lower signal traces 40 and 42 may have a common width, which may be determined based at least in part on a thickness of the first and third PCBs 4 and 8 and a desired characteristic impedance of the RF feedline structure. More generally, conventional stripline design techniques may be used to determine the dimensions of the RF feedline structure 2, including determination of the appropriate signal trace width given the selected thicknesses of each of the PCBs 4-8. If desired, the width(s) of the upper and lower signal traces 40 and 42 may be reduced at locations corresponding to the tabs 30, 46 and 56 (described below), so as to minimize impedance discontinuities along the length of the RF feedline structure 2.

The slots 20 may have any suitable length, and may be formed by any suitable technique, such as, for example, CNC milling or laser cutting. In some embodiments, a gap (g) between an edge of a signal trace 40, 42 and a wall of the open channel 18 (corresponding to edges of the cut-outs 14A and 14B, for example) may be equal to or greater than the width of the signal trace 40, 42. In some embodiments, a width of each slot 20 is equal to or less than the gap (g). Tabs 46 extending between adjacent slots 20 along the length of the open channel 18 are composed solely of dielectric layer 38 material (i.e. metal layers 34 and 36 are removed), but otherwise may have any suitable shape or configuration. In general, the number, placement and size of the tabs 46 may be selected to provide a suitable structural connection between the body of the PCB-2 6 and the suspended signal path 22, while minimizing dielectric losses. Dielectric losses are minimized by minimizing the volume of dielectric layer 38 material that is intersected by RF fields between the upper and lower signal traces 40 and 42 and the upper and lower ground planes 10 and 12, which favors minimizing both the number and size of the tabs 46. However, in practice it is not possible to eliminate the tabs 46 entirely, so that a suitable balance between reducing dielectric losses and maintaining acceptable structural rigidity must be obtained. In the illustrated embodiment, the shape of each tab 46 is determined by the circular ends of each slot 20, which corresponds to the use of a drill or milling cutter which may be used to form the slots 20.

In order to prevent RF signal leakage into the dielectric layer 38 material outside of the open channel 18, the upper and lower metal layers 34 and 36 are electrically connected, such as by vias 48. These vias 48 may be formed in a manner known in the art. A spacing between adjacent vias 48 may be selected to minimize RF signal leakage. For example, in some embodiments the spacing (s) may correspond to one-tenth (1/10) of a center wavelength of RF signals transmitted through the RF feedline structure. Alternatively, as may be seen in FIG. 3C, the upper and lower metal layers 34 and 36 may be connected by half-vias (not shown) and/or metal plating 49, which may be formed in a manner known in the art.

Referring now to FIGS. 1 and 4, PCB-3 8 includes an upper metal layer 50 and a lower metal layer 52 separated by a dielectric layer 54. Optionally, each metal layer 50 and 52 may be covered by a thin dielectric coating such as, for example, soldermask. In FIG. 1, PCB-3 8 is shown as a dual-sided printed circuit board, in which the upper and lower metal layers 50 and 52 are disposed on opposite surfaces of the dielectric layer 54. PCB-3 8 may be fabricated using a low-cost printed circuit board material such as FR-4. As noted above, FR-4 is commonly available from multiple manufacturers in a variety of thicknesses. PCB-3 8 may be formed as a dual-sided printed circuit board having a relatively thick core thickness, but this is not essential. If desired, PCB-3 8 may be provided as a multi-layer printed circuit board having one or more intermediate metal layers between the upper and lower metal layers 50 and 52. In such cases, PCB-3 8 may be fabricated using a two or more FR-4 printed circuit boards assembled together in a manner known in the art.

The elongated cut-outs 14B may have any suitable length, and may be formed by any suitable technique, such as, for example, computer-numerically controlled (CNC) milling or laser cutting. Tabs 56 extending between adjacent cut-outs 14B along the length of the open channel 18 are composed solely of dielectric layer 54 material (i.e. metal layers 50 and 52 are removed), but otherwise may have any suitable shape or configuration. In general terms, the number, placement and size of the tabs 56 may be selected to provide a suitable structural connection between portions of the PCB-3 8 extending on opposite sides of the open channel 18, while minimizing dielectric losses along the signal path 22. Dielectric losses are minimized by minimizing the volume of dielectric layer 54 material that is intersected by RF fields between the signal path 22 and the lower ground plane 12, which favors minimizing both the number and size of the tabs 56. However, in practice it may not be possible to eliminate the tabs 56 entirely, so that a suitable balance between reducing dielectric losses and maintaining acceptable structural rigidity may be obtained. In some embodiments, the placement of the tabs 56 (and also the tabs 30 if PCB-1 4) may be selected to avoid overlapping of the tabs 30 and 56, so as to minimize an impedance discontinuity due to the combined tabs 30 and 56 at a particular location along the signal path 22. In the illustrated embodiment, the shape of each tab 56 is determined by the circular ends of each cut-out 14B, which corresponds to the use of a drill or milling cutter which may be used to form the cut-outs 14B.

Figure 4B:
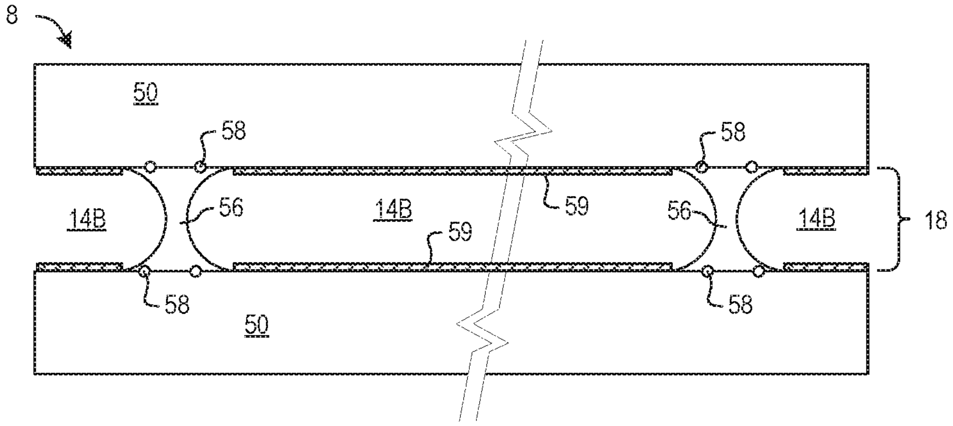

In order to prevent RF signal leakage into the dielectric layer 54 material outside of the open channel 18, the upper and lower metal layers 50 and 52 are electrically connected, such as by vias 58 disposed along the opposite walls of the cut-outs 14B. These vias 58 (which may be half-vias, also known as plated half-holes or plated castellated holes) may be formed in a manner known in the art. A spacing (s) between adjacent vias 58 may be selected to minimize RF signal leakage. For example, in some embodiments the spacing (s) may correspond to one-tenth of a center frequency of RF signals transmitted through the RF feedline. If desired, the upper and lower metal layers 50 and 52 may be electrically connected by metal plating 59 (FIG. 4B), either alone, or in combination with the vias 58. Metal plating can readily be formed on the inner walls of each cut-out 14B, except on each tab 56, using techniques well known in the art. For example, FIG. 4B illustrates a specific embodiment in which metal plating 59 is used to connect upper and lower metal layers 24 and 26 along the length of a cut-out 14B, and vias 58 (eg half-vias and/or full vias, as needed) used to prevent RF signal leakage at each tab 56.

PCB-3 8 may be electrically and mechanically connected to PCB-2 6, by solder connections between each of the vias 58 of PCB-3 8 and the lower metal layer 36 of PCB-2 6. In embodiments in which metal plating 59 is used to connect the upper and lower metal layers 50 and 52, the metal plating 59 may similarly be connected to the lower metal layer 36 of PCB-2 6 by solder connections. The use of solder connections in this manner is advantageous in that it is inexpensive to manufacture and prevents RF signal leakage through any soldermask on either or both of the lower metal layer 36 of PCB-2 6 and the upper metal layer 50 of PCB-3 8.

As noted above, upper and lower ground planes 10 and 12 electrically close the open channel 18, and facilitate propagation of RF signals along the suspended signal path 22. In the embodiment of FIG. 1, each ground plane 10, 12 is provided as a metal layer on a respective printed circuit board. Thus, ground plane 10 is a lower metal layer of a PCB 60, which may be electrically and mechanically connected to the upper metal layer 24 of PCB-1 4 using vias 62, which may be provided as half-vias. Similarly, ground plane 12 is an upper metal layer of a PCB 64, which may be electrically and mechanically connected to the lower metal layer 52 of PCB-3 8 using vias 66, which may be provided as half-vias. The use of vias 62 and 66 in this manner is advantageous in that it provides a low-cost method of joining the grounds planes 10,12 to PCB-1 4 and PCB-4 8. In addition, the spacing between vias 62 and 66 along the open channel can be selected to minimize RF signal leakage as described above. The inclusion of at least one layer of soldermask between the upper ground plane 10 and the upper metal layer 24 of PCB-1 4, and between the lower ground plane 12 and the lower metal layer 52 of PCB-3 8 may mitigate Passive Intermodulation (PIM). In addition, a spacing between the vias 32 of PCB-1 4 and half vias 62 of upper PCB 60, and between the vias 58 of PCB-3 8 and half vias 66 of lower PCB 64 may also be selected to minimize PIM.

Figure 5:
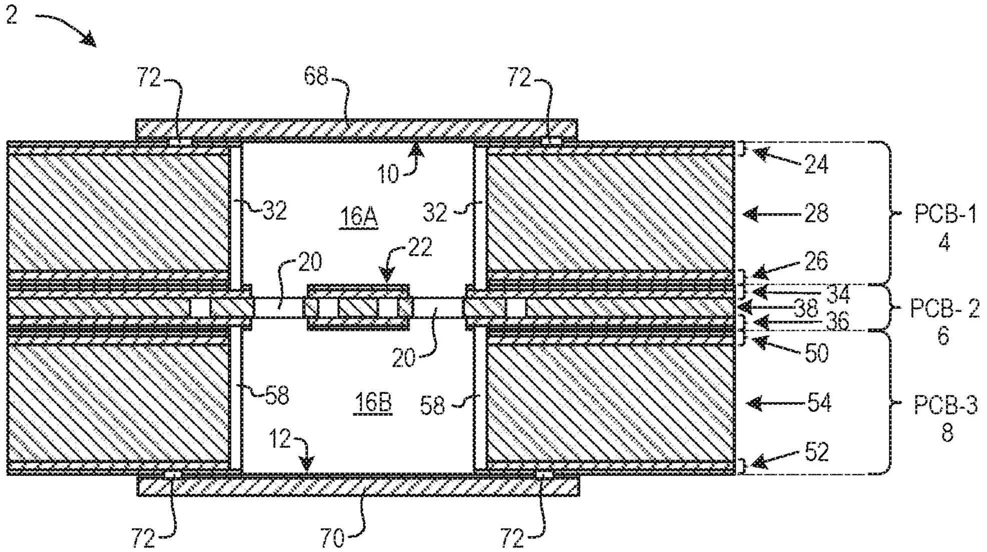
FIG. 5 is a cross sectional view of a feedline structure in accordance with another representative embodiment of the present disclosure

As may be appreciated, either one or both of the upper and lower ground planes 10 and 12 may be provided as metal plates rather than PCBs 60 and 64. FIG. 5 is a cross-sectional view of such an embodiment. In this case, the metal plates 68 and 70 (which may be composed of copper, or copper-plated steel, for example) may be mechanically and electrically connected to the upper and lower metal layers 24 and 52 using methods known in the art, such as solder bumps 72, for example.

Figure 6:
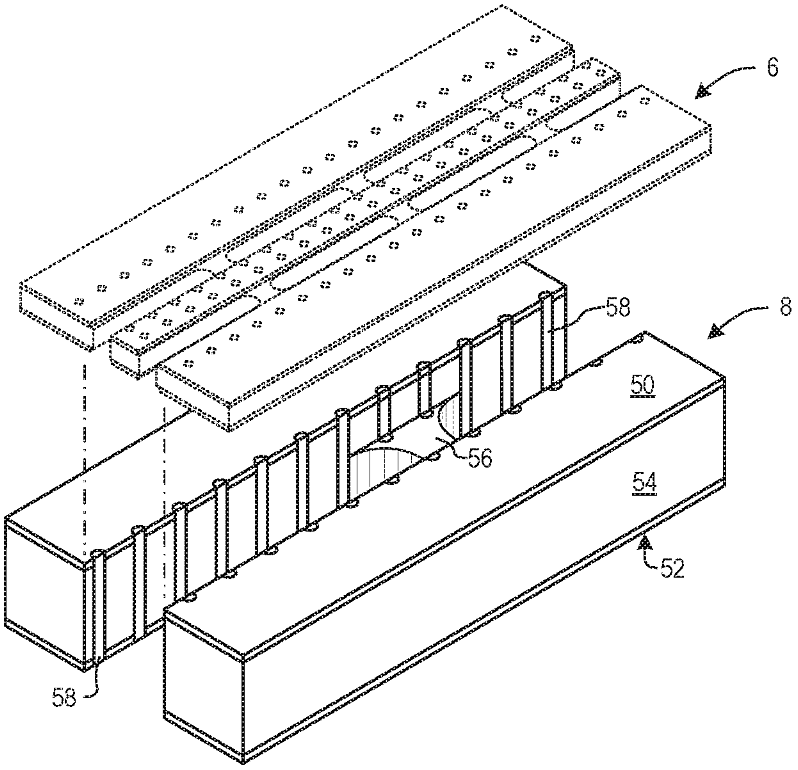
FIG. 6 is an exploded perspective view of elements of a feedline structure in accordance with a further representative embodiment of the present disclosure.

As may be further appreciated, the shape and configuration of PCB-1 4 and PCB-3 8 may be varied within the scope of the present disclosure. For example, FIG. 6 illustrates an embodiment in which a portion of each tab 56 is removed so as to reduce the volume of (lossy) dielectric material nearest to the signal traces 40 and 42 of PCB-2 6. A corresponding reduction of the tabs 30 of PCB-1 4 may also be provided, if desired.

Those skilled in the art will recognize improvements and modifications to the embodiments of the present disclosure. All such improvements and modifications are considered within the scope of the concepts disclosed herein.

What is claimed is:

1. A radio frequency (RF) feedline structure comprising:

a first printed circuit board (PCB) including an upper metal layer, a lower metal layer, and at least one elongated cutout defining an upper portion of an open channel, the upper and lower metal layers being electrically connected by at least one of metal plating and a plurality of half-vias disposed along opposite walls of the at least one elongated cutout;

a second PCB including an upper metal layer, a lower metal layer, and a plurality of elongated slots defining a suspended signal path disposed co-linearly within the open channel, the upper and lower metal layers being electrically connected by at least one of metal plating and a plurality of half-vias disposed along the suspended signal path; and a third PCB including an upper metal layer, a lower metal layer, and at least one elongated cutout defining a lower portion of the open channel, the upper and lower metal layers being electrically connected by at least one of metal plating and a plurality of half-vias disposed along opposite walls of the at least one elongated cutout; and respective upper and lower ground planes electrically connected to the upper metal layer of the first PCB and the lower metal layer of the third PCB, the upper and lower ground planes electrically closing the corresponding upper and lower portions of the open channel.

2. The RF feedline structure as claimed in claim 1, wherein the first PCB further comprises vias disposed proximal a tab between a pair of adjacent ones of the at least one elongated cutout.

3. The RF feedline structure as claimed in claim 1, wherein the third PCB further comprises vias disposed proximal a tab between a pair of adjacent ones of the at least one elongated cutout.

4. The RF feedline structure as claimed in claim 1, wherein:

the at least one of metal plating and plurality of half-vias of the first PCB are electrically connected to the upper metal layer of the second PCB; and the at least one of metal plating and plurality of half-vias of the third PCB are electrically connected to the lower metal layer of the second PCB.

5. The RF feedline structure as claimed in claim 1, wherein a spacing between adjacent ones of the half-vias of the first and third PCBs is selected to minimize leakage of RF signals propagating along the suspended signal path.

6. The RF feedline structure as claimed in claim 5, wherein the spacing is approximately one-tenth of a center wavelength of the RF signals propagating along the suspended signal path.

7. The RF feedline structure as claimed in claim 1, wherein the suspended signal path comprises:

an upper signal trace co-planar with the upper metal layer of the second PCB;

a lower signal trace co-planar with the lower metal layer of the second PCB; and at least one of metal plating and a plurality of half-vias electrically connecting the upper and lower signal traces.

8. The RF feedline structure as claimed in claim 7, wherein the upper and lower signal traces have a common width.

9. The RF feedline structure as claimed in claim 8, wherein the width of the upper and lower signal traces is based at least in part on a thickness of the first and third PCBs and a desired characteristic impedance of the RF feedline structure.

10. The RF feedline structure as claimed in claim 7, wherein a gap between an edge of one signal trace and a wall of the open channel is equal to or greater than the width of the signal trace.

11. The RF feedline structure as claimed in claim 10, wherein a width of each slot of the second PCB is equal to or less than the gap between an edge of one signal trace and a wall of the open channel.

12. The RF feedline structure as claimed in claim 1, wherein the upper ground plane comprises a metal layer of a fourth PCB.

13. The RF feedline structure as claimed in claim 1, wherein the lower ground plane comprises a metal layer of a fifth PCB.

14. The RF feedline structure as claimed in claim 1, further comprising a respective dielectric coating on at least one of the metal layers.

15. The RF feedline structure as claimed in claim 14, wherein the respective dielectric coating on at least one of the metal layers is a soldermask.

* * * * *